United States Patent
Dieffenderfer et al.

(10) Patent No.: US 7,523,265 B2
(45) Date of Patent: Apr. 21, 2009

(54) SYSTEMS AND ARRANGEMENTS FOR PROMOTING A LINE TO EXCLUSIVE IN A FILL BUFFER OF A CACHE

(75) Inventors: James Norris Dieffenderfer, Apex, NC (US); Praveen G. Karandikar, Cary, NC (US); Michael Bryan Mitchell, Fuquay-Varina, NC (US); Thomas Philip Speier, Holly Springs, NC (US); Paul Michael Steinmetz, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 11/083,615

(22) Filed: Mar. 18, 2005
(Under 37 CFR 1.47)

(65) Prior Publication Data

US 2006/0212659 A1    Sep. 21, 2006

(51) Int. Cl.
*G06F 12/00* (2006.01)
*G06F 13/00* (2006.01)
*G06F 13/28* (2006.01)

(52) U.S. Cl. .............. 711/141; 711/118; 711/119; 711/146

(58) Field of Classification Search ............... 711/141
See application file for complete search history.

(56) References Cited

U.S. PATENT DOCUMENTS

| 5,680,572 | A | 10/1997 | Akkary et al. |
|---|---|---|---|
| 5,781,926 | A | 7/1998 | Gaskins et al. |
| 5,895,486 | A | 4/1999 | Patel |
| 6,125,429 | A | 9/2000 | Goodwin et al. |
| 6,336,169 | B1 | 1/2002 | Arimilli et al. |
| 6,484,230 | B1 | 11/2002 | Konigsburg et al. |
| 6,643,745 | B1 * | 11/2003 | Palanca et al. .............. 711/138 |
| 2003/0110356 | A1 | 6/2003 | Williams, III |
| 2005/0138295 | A1 * | 6/2005 | Hammarlund et al. ....... 711/137 |
| 2005/0144398 | A1 * | 6/2005 | Hammarlund et al. ....... 711/145 |
| 2005/0223177 | A1 * | 10/2005 | Pentkovksi et al. .......... 711/145 |

* cited by examiner

*Primary Examiner*—Hyung Sough
*Assistant Examiner*—Gary W Cygiel
(74) *Attorney, Agent, or Firm*—Joscelyn G. Cockburn; Schubert Osterrieder & Nickelson PLLC (57) ABSTRACT

Systems and arrangements promoting a line from shared to exclusive in cache are contemplated. Embodiments include a cache controller adapted to determine whether a memory line for which the processor is to issue an address-only kill request resides in a fill buffer for the cache line in a shared state. If so, the cache controller may mark the fill buffer as not having completed bus transactions and issue the address-only kill request for that fill buffer. The address-only kill request may transmit to other processors on the bus and the other processors may respond by invalidating the cache entries for the memory line. Upon confirmation from the other processors, a bus arbiter may confirm the kill request, promoting the memory line already in that fill buffer to exclusive state. Once promoted, the fill buffer may be marked as having completed the bus transactions and may be written into the cache.

20 Claims, 4 Drawing Sheets

SYSTEMS AND ARRANGEMENTS FOR PROMOTING A LINE TO EXCLUSIVE IN A FILL BUFFER OF A CACHE

FIELD

The present invention generally relates to the field of coherency in a multi-processor environment. More particularly, the present invention relates to systems and arrangements for promoting a line from a shared state to an exclusive state in fill buffer of a cache.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

Users of digital processors such as computers continue to demand greater and greater performance from such systems for handling increasingly complex and difficult tasks. In addition, processing speed has increased much more quickly than that of main memory accesses. As a result, cache memories, or caches, are often used in many such systems to increase performance in a relatively cost-effective manner. Many modem computers also support "multi-tasking" or "multi-threading" in which two or more programs, or threads of programs, are run in alternation in the execution pipeline of the digital processor. Thus, multiple program actions can be processed concurrently using multi-threading.

At present, general-purpose computers, from servers to low-power embedded processors, include at least a first level cache L1 and often second and third levels of cache, L2 and L3. This cache memory system enables storing frequently accessed data and instructions close to the execution units of the processor to minimize the time required to transmit data to and from a higher latency memory. L1 cache is typically located within each processor to be closer to that processor's execution units. L2 and L3 caches are typically external to the processor chip but physically close to it. Accessing the L1 cache is faster than accessing the more distant system memory. Ideally, as the time for execution of an instruction nears, instructions and data are moved to the L2 cache from a more distant, higher latency memory.

Moving the instructions and data from a more distant memory generally involves retrieving a copy of a memory line from the more distant, higher latency memory and storing the copy of the memory line in a fill buffer for that L2 cache. The fill buffer temporarily stores the memory line until the memory line can be written into the cache.

In a multiprocessor environment, the state and ownership of a line must be properly communicated to each and every processor to maintain cache coherency. When a line of data is read into a processor's cache and there is no intention of modifying the line, then that line can be read in and stored in the cache in what is known as a 'shared' state. While this line is being filled from memory, if the processor wants to modify the data contained in that line, the processor must obtain 'exclusive' ownership of that line.

One solution allocates a second fill buffer for a new request for the memory line in an exclusive state, via, e.g., an address-only kill request. This solution also allows the previously allocated fill buffer to continue to receive the memory line in a shared state. Thus, two fill buffers contain the memory line, one in a shared state and one in an exclusive state. There are two significant drawbacks with allowing the same cache line to occupy two fill buffers. The first drawback is that the same cache line is now contained in two fill buffers of the same cache with conflicting states and as a result the logic must include additional functionality for control and data hazards. The second drawback is that multiple resources are consumed to manage the same cache line, which may otherwise be utilized for other cache requests.

Another solution allows the original fill buffer to receive the memory line in shared state and writes the line into the cache array while stalling the address-only kill request. Once the shared line is written into the cache, then the address-only kill is allowed to occupy a fill buffer and proceed to the bus to obtain the memory line in exclusive state. Unfortunately, the stall induced by this solution is as long as the memory latency needed to fill the cache line.

Therefore, there is a need for systems and arrangements to promote a cache line in a single fill buffer from shared state to exclusive state without causing a significant data hazard and without adding a latency that is as long as the latency needed to fill the cache line from a higher level of memory.

SUMMARY

The problems identified above are in large part addressed by systems and arrangements for promoting a line from a shared state to an exclusive state in a cache. One embodiment includes an apparatus to promote a line from a shared state to an exclusive state in a cache. The apparatus comprises a cache; a fill buffer associated with the cache to receive a line of memory to store in the cache, wherein fill buffer comprises status bits associated with the line of memory to indicate an ownership status; and a cache controller. The cache controller may be coupled with the fill buffer to receive a request for exclusive ownership of the line of memory from a processor associated with the cache, to respond by determining that the line is in a shared state, to transmit a request for exclusive ownership of the line to another processor, and to modify the ownership status of the line of memory upon receipt of a grant of the exclusive ownership for the line responsive to the request.

For example, in one embodiment, when a processor encounters a condition in which it needs exclusive ownership of a cache line (sometimes referred to as a coherency granule) and that line currently resides in a fill buffer in the shared state, a request for exclusive ownership (e.g. address-only kill) may be sent to a coherent bus but may be tracked for the cache line via a status bit. The status bit may prevent the cache line from being retired until the request for exclusive ownership is granted. The status bit may also prevent read requests that follow the request for exclusive ownership from using the shared fill buffer data of the cache line until the exclusive ownership is granted. Thus, in such embodiments, the shared data in the cache line may appear invalid during the window of time between generating the request for exclusive ownership and receiving the grant of exclusive ownership.

Another embodiment comprises a system to promote a line from a shared state to an exclusive state in cache. The system may include more than one processors coupled via a bus and associated with private caches; a fill buffer associated with a first private cache of the private caches to receive a memory line to store in the first private cache, wherein fill buffer comprises a status bit associated with the memory line to indicate an ownership status; and a cache controller. The cache controller may couple with the fill buffer to receive a request for exclusive ownership of the memory line from a first processor of the more than one processors based upon a request for exclusive ownership of the memory line to store the memory line in the first private cache, to respond by determining that the memory line is in a shared state, and to transmit a request for exclusive ownership of the memory line to other of the more than one processors. Upon receipt of a grant of the exclusive ownership for the line responsive to the request, the cache controller may modify the ownership status of the memory line.

A further embodiment comprises a method for promoting a line from a shared state to an exclusive state in cache. The method generally involves determining that a fill buffer is assigned to a memory line in a shared state; modifying a status bit associated with the fill buffer to indicate that receipt of a content of the memory line is incomplete and transmitting a request for exclusive ownership of the memory line to another processor. In response to a grant of exclusive ownership, the method may involve modifying an ownership status associated with the memory line in the fill buffer to indicate that the ownership is exclusive and modifying the status bit to indicate that receipt of the content of the memory line is complete after receiving of the grant.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems and arrangements to promote a line from shared to exclusive in a cache are disclosed. Embodiments may include a cache controller adapted to determine whether a memory line for which the processor is to issue an address-only kill request resides in a fill buffer for the cache line in a shared state. If so, the cache controller may mark or identify the fill buffer as not having completed bus transactions and issue the address-only kill request for that fill buffer. The address-only kill request may transmit to other processors on the bus and the other processors may respond by invalidating the cache entries for the memory line. Upon confirmation from the other processors, a bus arbiter may confirm the kill request, promoting the memory line already in that fill buffer to an exclusive state, advantageously avoiding the need to wait for another copy of the memory line to be stored in the fill buffer. Once promoted, if the bus transactions have finished transferring the memory line from the higher memory into the fill buffer, the fill buffer may be marked as having completed the bus transactions and may be written into the cache.

While portions of the following detailed discussion describe embodiments for one or more specific level of cache, implementations in one or more other levels of cache are also contemplated.

Figure 1:
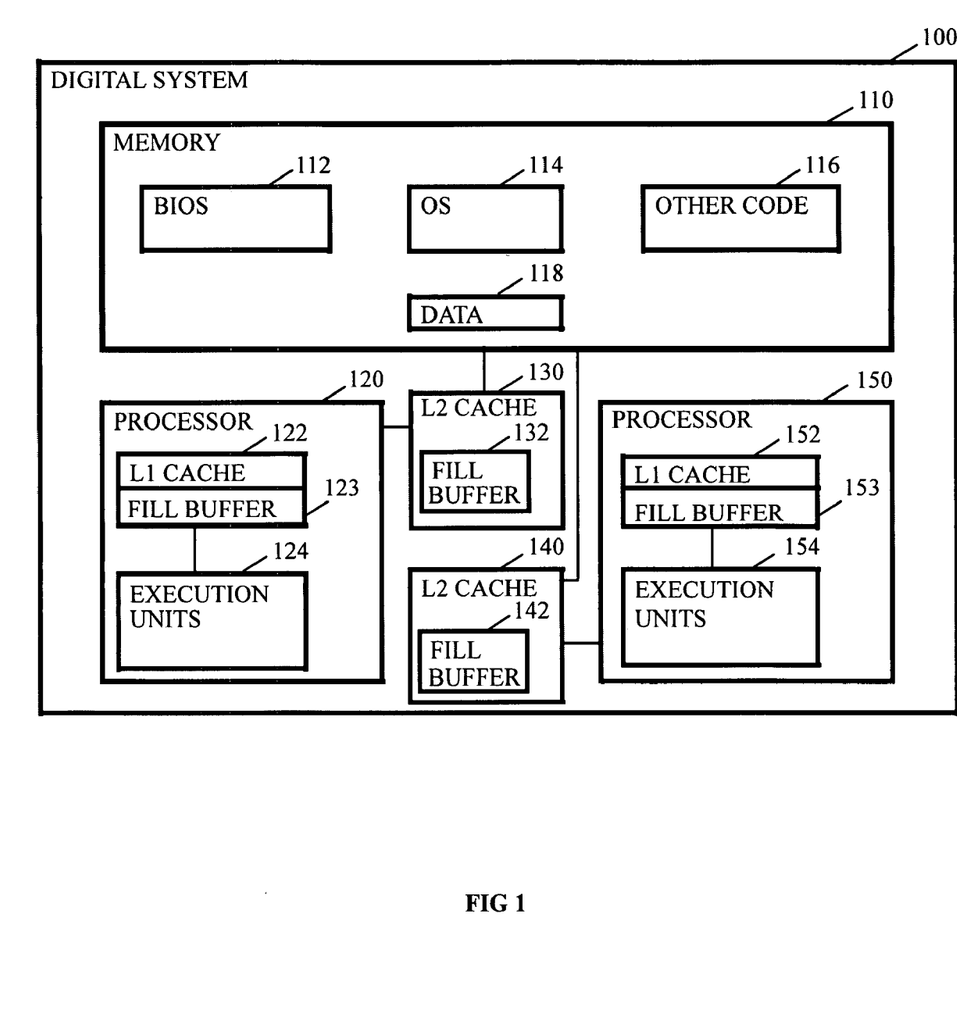
FIG. 1 depicts a digital system within a network; within the digital system is a digital processor adapted to promote a line from shared to exclusive in cache.

Turning to the drawings, FIG. 1 illustrates a digital system 100 adapted to promote a line from a shared state to an exclusive state in a cache. Digital system 100 may include, e.g., a workstation, server, mainframe, notebook, desktop, or the like. Digital system 100 comprises memory 110, processors 120 and 150, and L2 caches 130 and 140. Processors 120 and 150 operate according to BIOS 112 and Operating System (OS) 114 in memory 110. BIOS 112 is code that may be stored in a read-only memory (ROM). OS 114 is code typically loaded into memory when digital system 100 boots and may be stored on, e.g., a hard drive of digital system 100. Memory 108 may also store other code 116 and data 118 for execution by processors 120 and 150.

Processors 120 and 150 comprise on-chip level one (L1) caches 122 and 152, external level two (L2) caches 130 and 140, and execution units 124 and 154, respectively. Processors 120 and 150 may be assigned distinct tasks and/or may share tasks based upon availability. For instance, L1 cache 122 may receive and store instructions that are near to time of execution. Execution units 124 may receive the instructions and perform the operations called for by the instructions. Execution units 124 may comprise, for example, load/store units, integer Arithmetic/Logic Units, floating point Arithmetic/Logic Units, and Graphical Logic Units.

Processors 120 and 150 operate more efficiently when the contents of memory 110 are available for use immediately or within the lowest feasible number of cycles and the L2 cache and L1 cache help facilitate availability of the contents of memory by maintaining the most recently used instructions and data. Fill buffers 123 and 132 of L1 cache 122 and L2 cache 130, respectively, further improve availability by allowing memory lines to be transmitted in multiple packets. For example, a memory line requested by processor 120 from memory 110 may be assigned a line of fill buffer 132 of L2 cache 130. An arbiter of bussing between memory 110 and L2 cache 130 allows the memory line to transmit a packet at a time to fill buffer 132 as the bussing between memory 110 and L2 cache 130 becomes available for the transactions. Once the fill buffer 132 receives all the packets, i.e., the entire memory line, the memory line may be written into a bank of L2 cache 130.

When processor 120 requests a read of the content of a memory line such as code for an instruction and neither L1 cache 122 nor L2 cache 130 comprise a copy of that memory line, processor 120 may request that the memory line be stored in L2 cache 130 in a shared state. Retrieving the memory line in a shared state provides an opportunity for processor 150 to also maintain a copy of the memory in L2 cache 140 and/or L1 cache 152. As the memory line is retrieved and stored in fill buffer 132 of L2 cache 130, processor 120 may request the memory line in an exclusive state. For cache coherency, only one processor may have the memory line in an exclusive state because the processor may modify the memory line when held in an exclusive state.

Embodiments of the present invention advantageously respond to such a request by promoting the memory line already in fill buffer 132, or already being stored in fill buffer 132, to an exclusive state via a request for exclusive ownership rather than a request to transfer the memory line again but in an exclusive state. In the present embodiment, for example, prior to issuing the request to obtain the memory line in exclusive state, processor 120 may determine that the memory line is stored in fill buffer 132 or is in the process of being stored in fill buffer 132, in a shared state.

Upon determining the existence of the memory line in fill buffer 132 in a shared state, processor 120 may issue an address-only command to promote the memory line to exclusive state such as an address-only kill request, as there may be intent to modify data in the existing memory line. The processor associates the address-only kill request with the same position in fill buffer 132 as the memory line in shared state, marking the memory line as having an incomplete bus transaction. The status of an incomplete bus transaction prevents the write controller for the L2 cache from writing the memory line into a cache bank in a shared state and prevents any new requests for the memory line from taking an action such as loading another copy of the memory line from memory 110.

The address-only kill request also informs other processors such as processor 150 of the request for the memory line in exclusive state by processor 120. In response, processor 150 may invalidate copies of the memory line in L1 cache 152 and/or L2 cache 140. Upon invalidating the copies of the memory line, a completion for the request informs processor 120 that the processor 120 may maintain the memory line in exclusive state. Then, processor 120 may modify status bits associated with the copy of the memory line in fill buffer 132 to indicate that the memory line is held in an exclusive state. If the entire memory line has been read into fill buffer 132, the copy of the memory line may be written into the cache. On the other hand, if the bus transactions for the copy of the memory line in the buffer are incomplete, the copy of the memory line may be stored in the cache after the bus transactions finish.

In many embodiments, a cache controller for L1 cache 122 may also facilitate promotion of a copy of a memory line in fill buffer 123 in the same or a similar manner. Further, processor 150 may include logic to facilitate promotion of a copy of a memory line in fill buffers 153 and 142 in the same or a similar manner.

Digital system 100 may also include other components and subsystems not shown, such as a Trusted Platform Module, memory controllers, peripheral drivers, a system monitor, a keyboard, one or more flexible diskette drives, one or more removable non-volatile media drives such as a fixed disk hard drive, CD and DVD drives, a pointing device such as a mouse, and a network interface adapter, etc.

Figure 2:
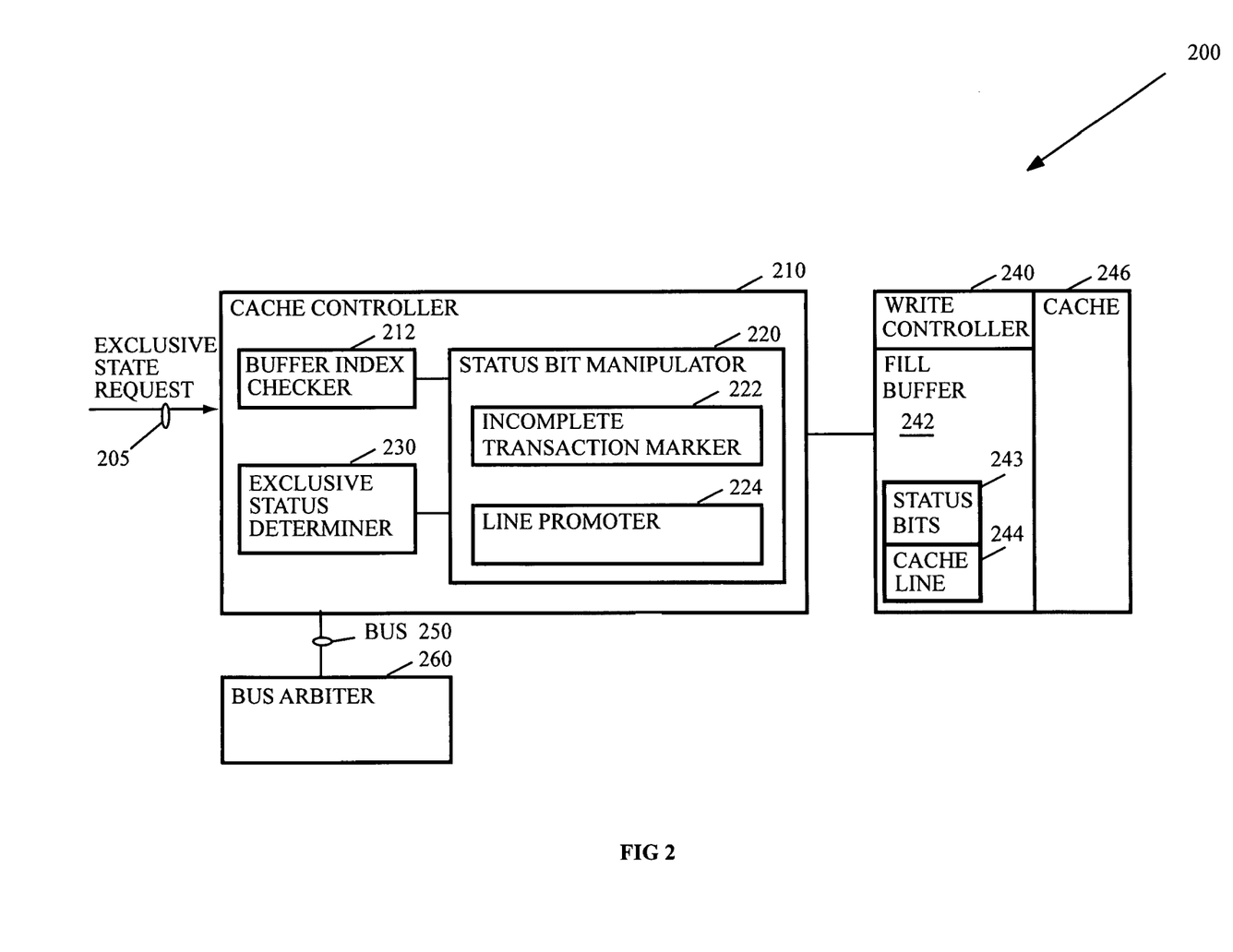
FIG. 2 depicts an embodiment of an apparatus having a cache controller adapted to promote a line in a fill buffer of a cache from shared to exclusive prior to writing the line from the fill buffer into the cache.

FIG. 2 depicts an embodiment of an apparatus 200 having a cache controller 210 adapted to promote a line 244 in a fill buffer 242 of a cache 246 from shared to exclusive prior to writing the line 244 from the fill buffer 242 into the cache 246. Apparatus 200 may comprise elements within and/or external to a processor such as a cache controller 210, a write controller 240, a fill buffer 242, and a cache 246 to promote a shared cache line 244 to an exclusive cache line. For example, a cache controller 210 may receive an exclusive state request 205 for a cache line 244 and determine whether the cache line 244 is stored in, or in the process of being stored in, fill buffer 242. If the cache line 244 is not stored in fill buffer 242, the cache line 244 may be requested from a higher level memory such as a higher level of cache or system memory. On the other hand, if fill buffer 242 comprises the cache line 244 but in a shared state, cache controller 210 may request that cache line 244 be promoted to exclusive state via bus 250 and arbiter 260. Promotion of cache line 244 changes the ownership status of the current content of cache line 244, the copy of the memory line or portion thereof, from a shared state to an exclusive state without having to request another copy of the memory line be transmitted to fill buffer 242. Cache controller 210 may also refrain from marking the cache line 244 as being complete or mark the cache line 244 as having incomplete bus transactions until receipt of a completion indicative of an exclusive state for the cache line 244 from bus arbiter 260.

Cache controller 210 may comprise a buffer index checker 212, a status bit manipulator 220, and an exclusive status determiner 230. Upon receipt of an exclusive state request 205 for cache line 244, buffer index checker 212 may determine whether fill buffer 242 has an entry assigned to the cache line 244 in an exclusive state. When the fill buffer comprises the cache line 244 in a shared state rather than an exclusive state, status bit manipulator 220 may modify status bits 243 associated with the cache line 244 to indicate that bus transactions to transfer the content from a higher memory into cache line 244 are not complete. Status bit manipulator 220 may not mark status bits 243 to indicate that the bus transactions have completed until both the transactions are complete and exclusive state is granted to cache line 244.

Status bit manipulator 220 comprises an incomplete transaction marker 222 and a line promoter 224. Incomplete transaction marker 222 may modify status bits 243 in response to an exclusive state request 205 upon determining that cache line 244 is maintained in a shared state in fill buffer 242.

Line promoter 224 may be responsive to exclusive state determiner 230 to modify status bits 243 to indicate that cache line 244 is held in an exclusive state. Exclusive status bit determiner 230 monitors bus 250 for a completion from bus arbiter 260 indicating that cache line 244 may be promoted to exclusive state. For example, after receipt of an exclusive state request 205 and upon determining that cache line 244 is held in a shared state, cache controller 210 may transmit a request to hold cache line 244 in an exclusive state via bus 250. Bus arbiter 260 may transmit the request to each processor on bus 250 and wait for a completion. Upon receipt of a completion from each processor, bus arbiter 260 may transmit a completion to cache controller 210. In response to receipt of the completion from bus arbiter 260, exclusive status determiner 230 may instruct status bit manipulator 220 to promote cache line 244 to an exclusive state. Then, line promoter 224 may change a bit of status bits 243 from zero to a one to indicate that cache line is in an exclusive state. In other embodiments line promoter 224 may change the bit from one to zero, Once status bits 243 indicate that cache line 244 is in an exclusive state, status bit manipulator 220 may modify status bits 243 to mark bus transactions as complete. Status bit manipulator 220 may wait until all the packets have been received for cache line 244. In further embodiments, status bit manipulator 220 may also wait until the requesting processor accesses the cache line 244 in the fill buffer 242 prior to identifying the cache line 244 as having completed the bus transactions.

Write controller 240 may write cache lines into cache 246 from fill buffer 242 after status bits 243 indicate that bus transactions have finished copying a memory line into fill buffer 242 from a higher-level memory such as another level of cache or a system memory. Cache 246 may be a high-speed memory on a processor or external to the processor but located relatively close to the processor or a group of processors. In some embodiments, cache 246 may comprise a private cache, which is adapted to service a single processor. In other embodiments, cache 246 may be a shared cache adapted to service a group of processors.

Bus 250 may be a bus utilized for coherency transactions between processors. For instance, bus 250 may be a main bus, interconnecting processors and system memory with an input-output (I/O) hub. In other embodiments, bus 250 may comprise a high-speed backside bus adapted to facilitate communications between processors. For example, in one embodiment, when a processor encounters a condition in which it needs exclusive ownership of cache line 244 (sometimes referred to as a coherency granule) and that line 244 currently resides in fill buffer 242 in the shared state, a request for exclusive ownership (e.g. address-only kill) may be sent to a coherent bus such as bus 250 but may be tracked for cache line 244 via status bit 243. Status bit 243 may prevent cache line 244 from being retired until the request for exclusive ownership is granted. Status bit 243 may also prevent read requests that follow the request for exclusive ownership from using the shared fill buffer data of cache line 244 until the exclusive ownership is granted. Thus, in such embodiments, the shared data in cache line 244 may appear invalid during the window of time between generating the request for exclusive ownership and receiving the grant of exclusive ownership.

Bus arbiter 260 may coordinate bus transactions on bus 250. In many embodiments, bus arbiter 260 is adapted to receive an exclusive ownership request from the requesting processor and distribute the request to other processors. Then, upon receipt of completions from each of the processors, bus arbiter 260 may transmit a completion indicating a grant of exclusive ownership to the requesting processor.

Figure 3:
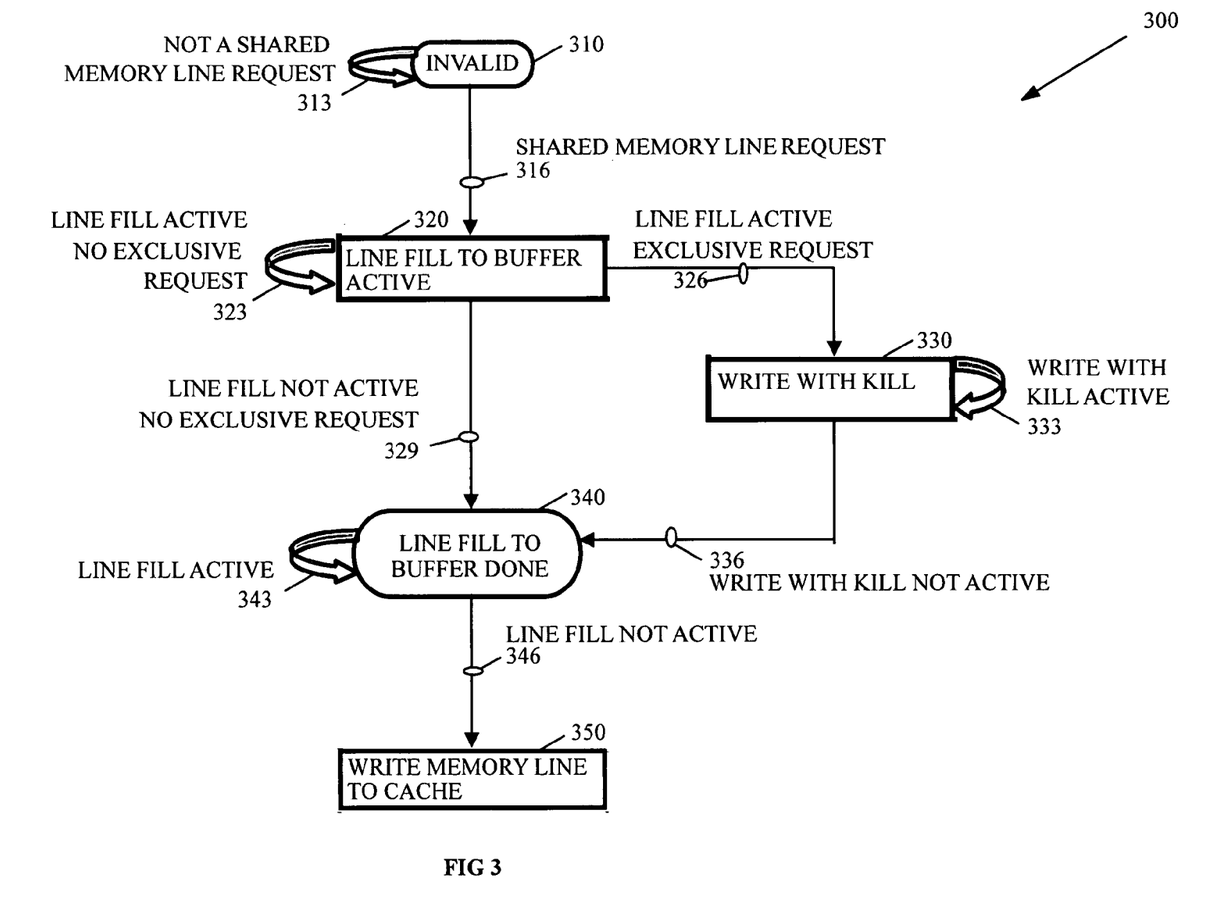
FIG. 3 depicts a state diagram of an embodiment to promote a shared cache line to exclusive state for a multiple processor system such as the system in FIG. 1.

FIG. 3 shows a state diagram 300 of an embodiment to promote a shared cache line to exclusive state for a multiple processor system such as the system in FIG. 1. The following discussion describes state diagram 300 in conjunction with an L2 cache. However, state diagram 300 may apply to any level of caching and, in several embodiments, state diagram 300 may be incorporated into logic or cache controllers for more than one level of cache. Note also that while state diagram 300 is illustrated with a specific set of states to describe one category of embodiments that follow a particular snooping protocol, other variations of state diagram 300 and other snooping protocols are also contemplated.

State diagram 300 comprises five distinct states: an 'invalid' state 310, a 'line fill to buffer active' state 320, a 'write with kill' state 330, a 'line fill buffer done' state 340, and a 'write memory line to cache' state 350. The 'invalid' state 310 may represent a state in which a memory line being maintained in system memory has not been copied into a cache of one of the processors. While none of the requests of a processor comprise a 'shared memory line request' 313, the embodiment remains in the invalid state 310. Upon receipt of a 'shared memory line request' 316, the embodiment advances to the 'line fill to buffer active' state 320.

The 'line fill to buffer active' state 320 represents a state in which a request is transmitted to initiate bus transactions to copy a memory line from the system memory into a fill buffer for an L2 cache. The embodiment remains in the 'line fill to buffer active' state 320 while the line is being copied, or, in other words, while the line fill remains active, and the processor has not made a 'request for exclusive ownership of the memory' line 323. If the line fill completes before receiving a 'request for exclusive ownership of the memory line' 329, the embodiment advances to the 'line fill to buffer done state 340. Otherwise, if an exclusive request is received while filling the buffer 326 and the embodiment advances to the 'write with kill' state 330.

The 'write with kill' state 330 represents a condition in which an 'exclusive state request' 326 is transmitted to other processors and the status of the buffer is marked to indicate that bus transactions to fill the buffer have not completed. Further, the status of the buffer remains marked to indicate that bus transactions are incomplete while in the 'write with kill' state 330 and the embodiment does not advance to the 'line fill to buffer done' state 340 until the cache controller receives an indication that the processor has exclusive ownership of the line 336. Advantageously, the exclusive request is an address-only request because a copy of the memory line is already being copied into the fill buffer and the reply is substantially faster than copying the line from the system memory. Furthermore, any new requests that match the promoted line will see the pending state change and wait for the promotion from the shared state to an exclusive state to occur before taking any action, such as returning state information to the L1 cache.

The 'line fill to buffer done' state 340 is a state in which the line fill to copy the memory line from system memory into the fill buffer is completed and the fill buffer is available to copy into the cache or the bus arbiter has replied to the exclusive state request. If the line fill is still active 343, the embodiment remains in the 'line fill to buffer done' state 340 until the line fill completes. Otherwise, when the line fill is not active 346, the embodiment advances to the 'write memory line to cache' state 350. In some embodiments of the present invention, the line fill may remain active until the transaction finishes copying the line into the fill buffer and the processor has accessed the memory line while the line is in the fill buffer. In such embodiments, the line is then written into the cache.

In the 'write memory line to cache' state 350, the copy of the memory line in the fill buffer is written into the cache along with a status bit or bits indicating that the memory line is in an exclusive state. Thus, the processor has exclusive ownership and may modify or write over the contents of the memory line.

Figure 4:
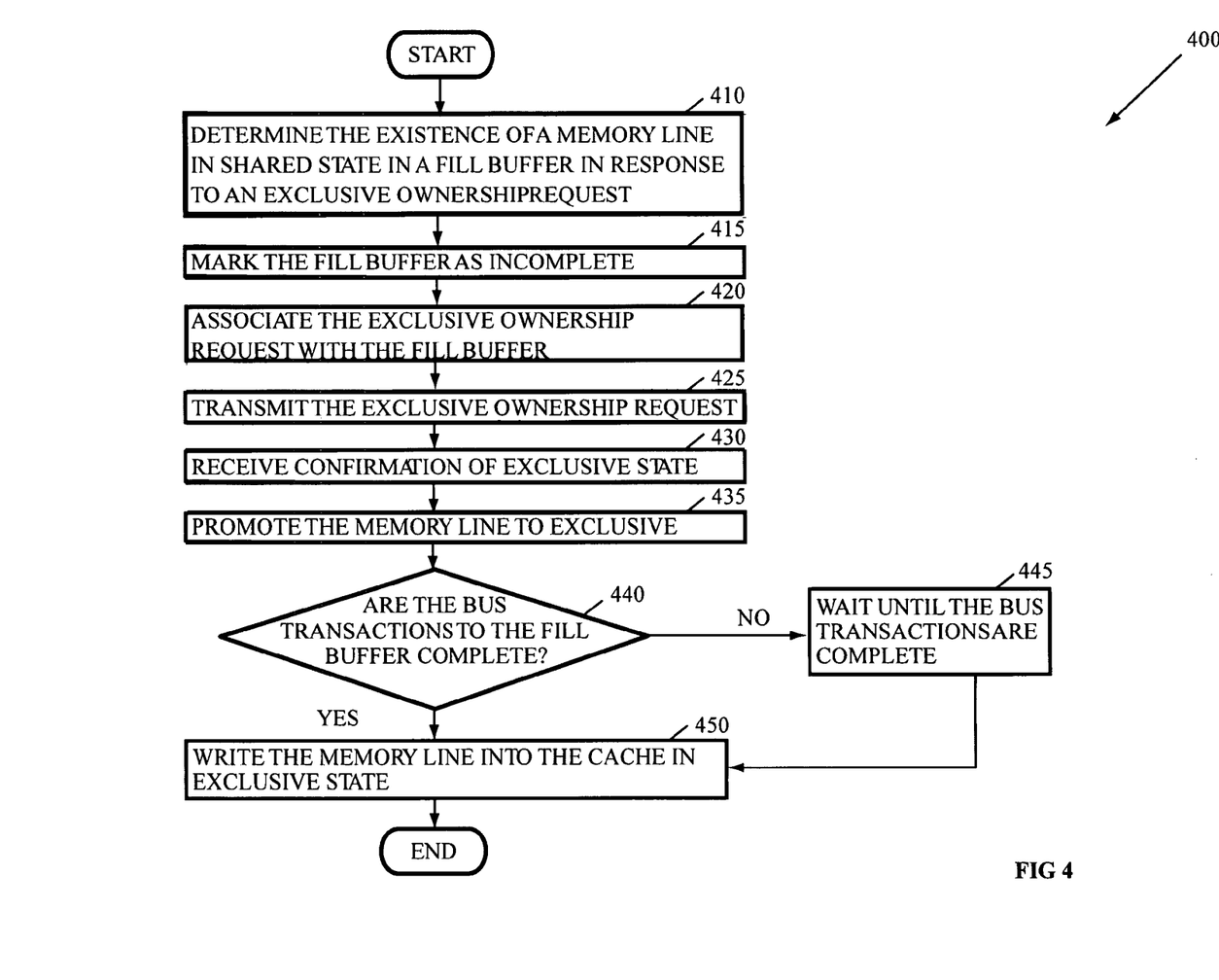
FIG. 4 depicts a flowchart of an embodiment to promote a line of cache from shared to exclusive.

FIG. 4 depicts a flowchart 400 of an embodiment to promote a line of cache from shared to exclusive. Flowchart 400 may describe the process of promoting a line of memory in a fill buffer of a level of cache in or near a processor to an exclusive state. More specifically, after receiving a request for exclusive ownership of a memory line, flowchart 400 determines the existence of the memory line in a shared state in a fill buffer for a cache such as L2 cache (element 410). For example, upon receiving the request for exclusive ownership, a cache controller for the cache may check the cache for the memory line. The memory line may still be in the fill buffer and may have not received all the packets for the content of the memory line. Further, the status bits associated with the fill buffer may indicate that the memory line is in a shared state.

As a result of determining that the memory line is in the fill buffer in a shared state, the cache controller may mark the fill buffer as incomplete (element 415). Marking the fill buffer as incomplete for that memory line prevents the line from being written into the cache before the line can be promoted to an exclusive state.

Once the fill buffer is marked as incomplete, the cache controller may associate the exclusive ownership request with the fill buffer (element 420) and then transmit the exclusive ownership request to other processors within the digital system via a bus arbiter (element 425). The other processors may respond by invalidating copies of the cache line retained in private caches and reply with completion. The bus arbiter may receive the replies and grant ownership to the requesting processor (element 430) upon receipt of the completion from each of the processors in the digital system.

After receiving exclusive ownership of the memory line, the cache controller may modify the status bits associated with the fill buffer, which are associated the memory line to indicate the ownership is exclusive rather than shared (element 435). Then, if the fill buffer has received a complete copy of the memory line and the processor has utilized the content of the memory line (element 440), the memory line will be available to write into the cache (element 450). Otherwise, the cache controller may wait until the bus transactions for copying the memory line into the fill buffer have completed (element 445) and then indicate that the memory line is available for storage into the cache in an exclusive state (element 450).

It will be apparent to those skilled in the art having the benefit of this disclosure that the present invention contemplates methods and arrangements to promote a line of cache from shared to exclusive. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments describe herein may be utilized according to the present invention. Accordingly, the appended claims are intended to include within their scope such processes, machines, manufacture, compositions of matter, means, methods, or steps.

What is claimed is:

1. An apparatus, comprising:
   a cache;
   a fill buffer associated with the cache, wherein the fill buffer comprises a first line to associate with a first request to receive a line of memory to store in the cache, wherein the fill buffer comprises status bits associated with the first line to indicate an ownership status of the first line; and
   a cache controller coupled with the fill buffer, configured to receive a request for exclusive ownership of the line of memory from a processor associated with the cache, to determine that the line of memory is not within the cache, to determine that the first request for the line of memory is associated with the first line of the fill buffer and is for shared ownership, in response to receiving the request for exclusive ownership, after issuing the first request and prior to writing the first line from the fill buffer into the cache, to transmit the request for exclusive ownership of the line of memory to another processor, wherein the request for exclusive ownership is associated with the first line of the fill buffer, after receiving the request for exclusive ownership from the processor, and to modify the ownership status of the line of memory received in response to the first request in the first line of the fill buffer upon receipt of a grant of the exclusive ownership for the line of memory responsive to the request for exclusive ownership and prior to writing the first line from the fill buffer into the cache.

2. The apparatus of claim 1, further comprising a bus arbiter to receive the request for exclusive ownership of the line of memory and to transmit the request for exclusive ownership to one or more other processors.

3. The apparatus of claim 2, wherein the bus arbiter is adapted to receive responses from the one or more other processors and to transmit the grant of the exclusive ownership upon receipt of the responses from all of the one or more other processors.

4. The apparatus of claim 1, wherein the cache comprises more than one levels of cache, the fill buffer comprises a buffer for each of the more than one levels of cache, and the cache controller comprises a controller for each of the more than one levels of cache.

5. The apparatus of claim 1, wherein the cache controller is adapted to track the request for exclusive ownership associated with the first line of the fill buffer via a status bit indicative of the ownership status, wherein read requests for the first line in the fill buffer are invalid until the grant is received.

6. The apparatus of claim 1, wherein the cache controller comprises an index checker to read the status bits associated with the fill buffer to determine that the line of memory in the first line of the fill buffer is held in a shared state.

7. The apparatus of claim 1, wherein the cache controller comprises a status bit manipulator to identify the first line as having incomplete bus transactions.

8. The apparatus of claim 1, wherein the cache controller comprises a line promoter to modify a status bit of the status bits, associated with the first line in the fill buffer to modify the ownership status from shared to exclusive.

9. A digital system, comprising:
   more than one processors coupled via a bus and associated with private caches;
   a fill buffer associated with a first private cache of the private caches to receive a memory line to store in the first private cache, wherein the fill buffer comprises a first line to receive the memory line in response to a first request and a status bit associated with the first line to indicate an ownership status of the memory line upon receipt in the first line of the buffer; and
   a cache controller coupled with the fill buffer, to receive a request for exclusive ownership of the memory line from a first processor of the more than one processors, configured to determine that the memory line is not within the first private cache, to determine that the first request for the memory line is associated with the first line of the fill buffer and is for shared ownership, in response to receiving the request for exclusive ownership, after issuing the first request for the memory line and prior to writing the memory line, from the first line of the fill buffer into the first private cache, to transmit the request for exclusive ownership of the memory line to other of the more than one processors, and to modify the status bit to change the ownership status of the first line to an exclusive state upon response by the other of the more than one processors to the request for exclusive ownership and prior to writing the memory line from the fill buffer into the first private cache.

10. The system of claim 9, further comprising a system memory coupled with the cache controller via the bus, wherein the system memory comprises the memory line.

11. The system of claim 9, further comprising a bus arbiter coupled with the bus to receive the request for exclusive ownership of the memory line from the cache controller and to transmit the request for exclusive ownership to the other of the more than one processors.

12. The system of claim 11, wherein the bus arbiter is adapted to receive the response by the other of the more than one processors and to transmit a grant of the exclusive ownership based upon the response by the other of the more than one processors.

13. The system of claim 9, further comprising a write controller adapted to read the memory line from the first line of the fill buffer and to write the memory line into the first private cache along with the status bit as an indication of the exclusive ownership.

14. The system of claim 9, wherein the cache controller comprises a status bit manipulator to mark the memory line as having incomplete bus transactions.

15. A method, comprising:
   determining that a memory line does not reside in a cache:
   determining that a fill buffer is assigned to the memory line in response to a first request for the memory line and that the memory line is associated with a shared state;
   modifying a status bit associated with the fill buffer to indicate that receipt of a content of the memory line is incomplete;
   transmitting, from a first processor, a request for exclusive ownership of the memory line to one or more other processors prior to writing the memory line from the fill buffer to the cache;
   modifying an ownership status associated with the memory line in the fill buffer associated with the first request in response to receipt of exclusive ownership in response to the request for exclusive ownership to indicate that the ownership by the first processor is exclusive prior to writing the memory line from the fill buffer to the cache, based upon response to the request for exclusive ownership by the one or more other processors; and
   modifying the status bit to indicate that receipt of the content of the memory line is complete after the response.

16. The method of claim 15, further comprising writing the memory line into the cache after modifying the status bit.

17. The method of claim 15, wherein transmitting, from the first processor, the request comprises associating the request with the fill buffer.

18. The method of claim 15, wherein transmitting, from the first processor, the request comprises transmitting the request to the one or more other processors via a bus arbitrator, the bus arbitrator to transmit a grant of exclusive ownership for the first processor upon receipt of the response.

19. The method of claim 15, wherein modifying the ownership status comprises modifying another status bit that is associated with the memory line in the fill buffer.

20. The method of claim 15, wherein modifying the status bit to indicate that receipt of the content of the memory line is complete comprises modifying the status bit after the processor accesses the memory line in the fill buffer.

* * * * *